Dec. 16, 1969     J. L. LORENZ     3,484,805
CONTROL OR SIGNAL CIRCUITS FOR ICE BANK
Filed Feb. 2, 1966     3 Sheets-Sheet 1

INVENTOR.
JEROME L. LORENZ
BY
Roy E. Raney

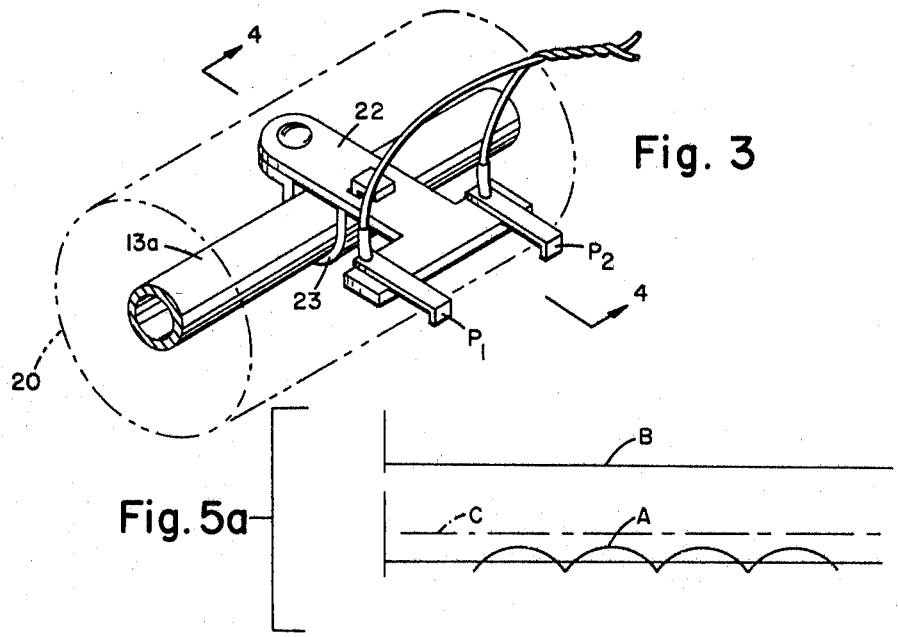
Fig. 3
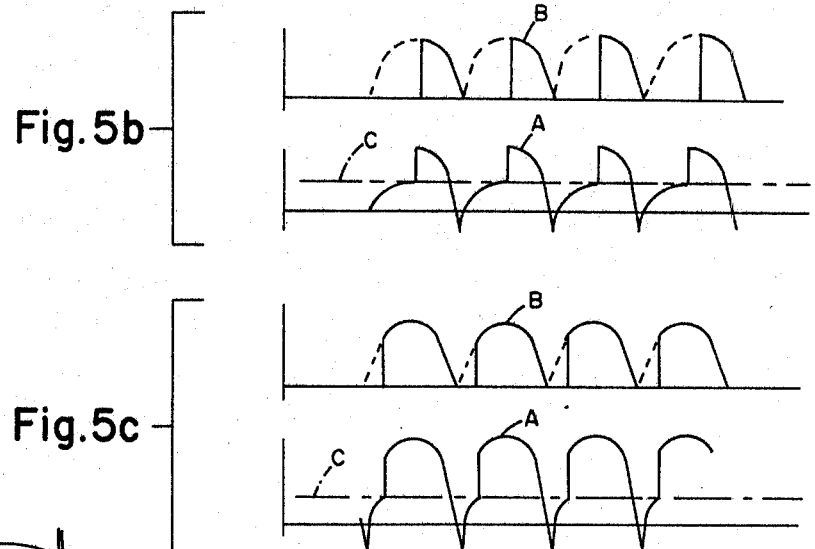
Fig. 5a
Fig. 5b
Fig. 5c
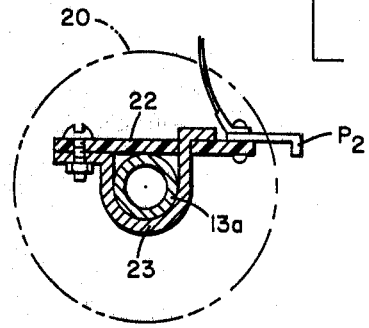
Fig. 4
INVENTOR
JEROME L. LORENZ
BY
ATTORNEY Dec. 16, 1969  J. L. LORENZ  3,484,805
CONTROL OR SIGNAL CIRCUITS FOR ICE BANK
Filed Feb. 2, 1966  3 Sheets-Sheet 3

INVENTOR.
JEROME L. LORENZ
BY
*Roy E Raney*

United States Patent Office 3,484,805
Patented Dec. 16, 1969

3,484,805
CONTROL OR SIGNAL CIRCUITS FOR ICE BANK
Jerome L. Lorenz, Columbus, Ohio, assignor to Ranco Incorporated, Franklin County, Ohio, a corporation of Ohio
Continuation-in-part of abandoned application Ser. No. 320,366, Oct. 31, 1963. This application Feb. 2, 1966, Ser. No. 524,409
Int. Cl. F25b 49/00
U.S. Cl. 62—139                                23 Claims

ABSTRACT OF THE DISCLOSURE

The invention discloses an electrical control circuit which senses conductivity changes of an environment and provides a control signal in response to such changes so as to energize a relay. In one specific embodiment used for controlling an ice bank tank a pair of spaced electrodes in response to ice buildup triggers a coupled pair of transistors which in turn actuate a relay. The relay controls refrigeration means for building up more or less ice in the bank.

---

The present application is a continuation-in-part of my co-pending application, Ser. No. 320,366 filed Oct. 31, 1963, now abandoned.

The present invention relates to electrical control or signal circuits which are responsive to changes in conductivity of the environment surrounding electrodes in the circuits to perform a control or signal function.

The invention relates to electrical control circuits particularly suitable for controlling ice bank type refrigerators, such as milk or beverage coolers, wherein substantially even temperatures are maintained in a water bath by cyclically operating freezing means in the bath to maintain a body of ice in the water, the freezing cycle of the freezing means being initiated when the ice diminishes to a minimum predetermined thickness and terminated when this ice thickness increases by a predetermined degree. Control circuits embodying the present invention and utilized as ice bank control circuits are responsive to the difference between the electrical conductivity of ice and that of water to cycle the freezing means as necessary to maintain optimum ice thickness in the ice bank. The invention could as well be employed in control or signal circuits responsive to the presence or absence of a material at a given position.

A principal object of the present invention is the provision of a new and improved low cost yet effective electrical conductivity responsive control or signal circuit utilizing inexpensive and durable components, such as transistors and diodes, and a novel circuit configuration which is capable of performing a control or signal function in response to changes in electrical conductivity of a substance, or substances, forming the environment of sensing elements associated with the circuits. An important feature of the novel circuit of the invention is the absence of a current flow between the sensing elements which will cause the formation of gases or other electrolytic action.

Another object of the present invention is the provision of a new and improved transistorized control circuit utilizing only two electrodes which may be arranged in proximity to the freezing unit of an ice bank type cooler tank so that the resistance to current flow through water therebetween will increase as the water freezes and decreases as ice therebetween melts, the circuit being responsive to such resistance changes to initiate a freezing cycle when the current flow between their electrodes increases beyond a first predetermined value and to terminate the freezing cycle when the current flow decreases to a second lower predetermined value appreciably below the first value, whereby ice is maintained in an optimum range of thickness while minimizing the frequency of cycling the freezing means.

Yet another object of the present invention is the provision of a new and improved electrolytic control circuit of the foregoing character wherein the electrodes are supplied with the AC component of full wave rectified but unfiltered DC potential through a capacitor coupling so as to provide a biasing voltage wave form comprising a series of amplitude peaks, the amplitude of which changes in accordance with changes in the resistance between the electrodes, the biasing voltage being utilized to control a switching amplifier means operable to provide output power to actuate a relay or other control or signal devices.

Another object of the present invention is the provision of a new and improved control circuit of the foregoing character wherein the electrodes are supplied with the DC component of full wave rectified but unfiltered AC potential through a capacitor coupling so as to provide a biasing voltage wave form comprising a series of amplitude peaks, the amplitude of which change in accordance with changes in the resistance between the electrodes, the biasing voltage being utilized to control the switching amplifier means having an output which jumps from zero to half power when the biasing voltage peaks increase in amplitude above the threshold, the output power of the amplifier means being utilized to actuate a relay for initiating and terminating the freeezing cycles. The relay may be bistable at half power, that is to say, the relay is actuatable to one operative position only by an increase in energization to a level appreciably above half power and is only actuatable to its other operative position by reduction in energization to a level appreciably below half power.

Another object of the present invention is the provision of a new and improved liquid level control including a control circuit of the character described and which includes three electrodes spaced vertically apart in a container which is adapted to store a more or less electrolytic liquid and which includes a mechanism for dispensing the liquid therefrom periodically, and wherein liquid rising to a predetermined level in the container establishes a first conductive path between a second pair of the electrodes, the second conductive path maintaining the circuit in an energized condition until the decrease in the liquid level in the container decreases the conductivity of the second path to de-energize the circuit and refill the container to the predetermined level.

The invention further provides a new and improved control circuit of the character mentioned in which the control is unaffected by transient circuit noises and which provides a control circuit output having a substantial hysteresis loop for operating the solenoid of a control relay in a positive, nonchattering manner.

Other objects and advantages of the present invention will become apparent from the following detailed description of the presently preferred electronic ice bank control embodying the invention read in conjunction with the accompanying sheets of drawings forming a part of this specification, and in which:

FIG. 3 is a fragmentary perspective view of a portion of the apparatus of FIG. 1 on an enlarged scale and illustrating ice sensing electrodes thereof;

FIG. 4 is a sectional view taken substantially along line 4—4 of FIG. 3;

FIGS. 5a, 5b, 5c are graphic illustrations of electrical operating characteristics of the circuit of FIG. 2;

Figure 1:
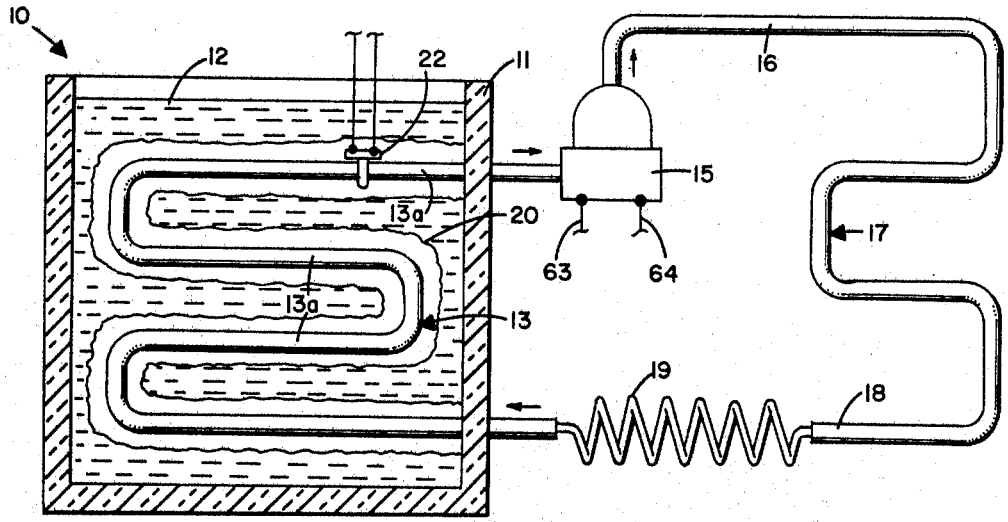
FIG. 1 is a schematic illustration of an exemplary ice bank type refrigerating apparatus which may be controlled by the circuit of this invention.

Referring to FIG. 1, there is provided an ice bank refrigerating apparatus, generally indicated at 10, of a type suitable for use in a milk or beverage cooler. The apparatus 10 comprises, in this example, an ice bank tank 11 containing water 12, in which is immersed an evaporator coil 13 forming part of a conventional compressor-condenser-expander type refrigerating system. The evaporator coil 13 is conveniently comprised of metal tubing 13a which is in direct contact with the water in the tank 11. This system includes an electrical motor driven compressor 15, operable to compress a fluid refrigerant and force it through a line 16 to a condenser coil 17, where heat is given up to the surrounding air, and thence through a line 18 and a restriction or capillary 19 to the evaporator coil 13 where heat is extracted from the body of water 12 which freezes to form a layer of ice 20 around the tubing 13a of the evaporator coil. From the evaporator 13, the vaporized refrigerant is returned to the intake side of the compressor. The compressor 15 is operated periodically in a manner described hereinafter to maintain the layer of ice 20 at an optimum thickness as the water 12 absorbs heat from a beverage cooler or the like to maintain a substantially even temperature therein.

In order to operate the compressor 15 periodically to maintain the optimum thickness of the ice 20, there is provided an electronic control circuit 21 (FIG. 2) including a pair of electrodes P1 and P2, best illustrated in FIGS. 3 and 4. The circuit 21 is responsive to increases in resistance to current flow between the electrodes P1 and P2 when ice is formed therebetween, as compared to the relatively low resistance to current flow when free water interconnects the electrodes. The electrodes P1 and P2 are conveniently formed of stainless steel and are supported by a T-shaped insulator 22 clamped to the tubing 13a of the evaporator coil 13 by a suitable U-shaped bracket 23. Preferably, the electrodes P1 and P2 are elongated and are arranged in spaced parallel relation with their long axes normal to the tubing 13a of the evaporator coil. By this arrangement, in which the electrodes are aligned in the direction of growth of the layer of ice 20, as the ice increases in thickness about the tubing 13a, the area of each electrode exposed to free water will progressively decrease and the resistance to current flow therebetween will increase.

Figure 2:
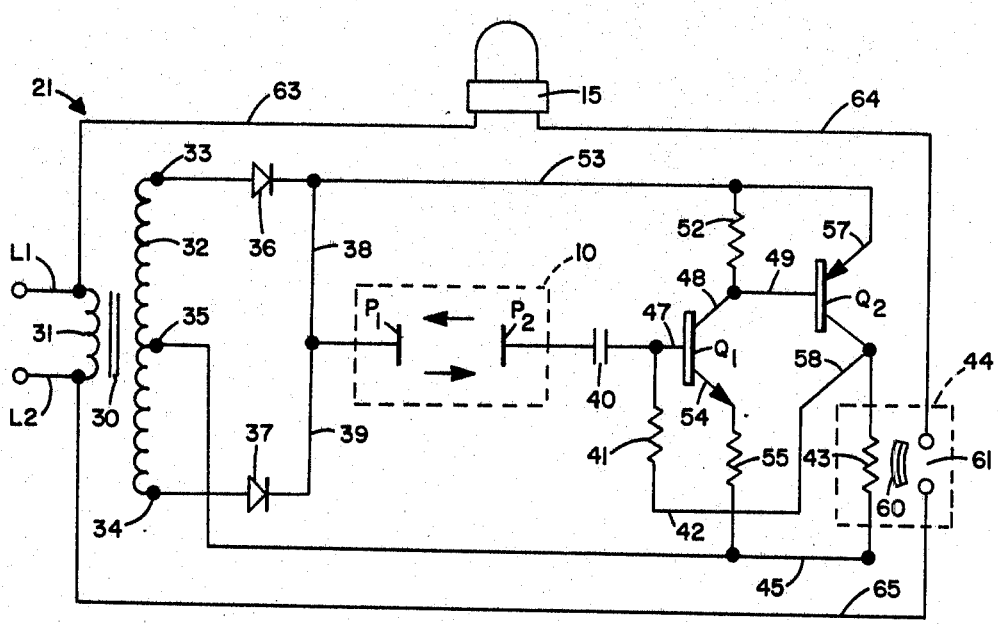
FIG. 2 is a diagrammatic illustration of an electronic control circuit embodying the invention.

Referring now to FIG. 2, the improved electronic control circuit 21 comprises a voltage reducing transformer 30, the primary winding 31 of which is connected to power lines L1 and L2 carrying single phase alternating current such as the usual 115 volt 60 cycle domestic current. The secondary winding 32 of the transformer 30 is provided with end terminals 33 and 34 and a center tap 35. The end terminals 33 and 34 are connected through diode type rectifiers 36 and 37 respectively, and conductors 38 and 39 to the ice sensing electrode P1. The electrode P2 is connected through capacitor 40, resistor 41, conductor 42, a resistance heater 43 of a thermal relay 44, and a conductor 45 to the center tap 35.

The rectifiers 36 and 37 are oriented to provide full wave rectified potential for the amplifier circuit and it will be recognized that when a conductive medium such as free water exists between electrodes P1 and P2, the AC component of the unfiltered full wave rectified potential impresses an AC current between electrodes P1 and P2. The capacitor 40 blocks the DC component and limits the current flow between the electrodes, while the resistor 41 provides a biasing voltage drop proportional to the electrode current for controlling a switching amplifier means including transistors Q1 and Q2, the voltage wave form across resistors 41 and 43 being illustrated at A in FIGS. 5a, 5b, 5c. The transistors Q1 and Q2 utilize oppositely directed bias potentials and are directly coupled in complementary fashion. Thus, the transistor Q1, which has its base connection 47 connected to the electrode P2 through capacitor 40, has its collector 48 conected directly to the base connection 49 of the transistor Q2, and through a resistor 52 and a conductor 53 to the full wave rectified output of the rectifiers 36 and 37. The emitter connection 54 of the transistor Q1 is connected through a resistor 55 and conductor 45 to the center tap 35.

The emitter connection 57 of the transistor Q2 is connected through the conductor 53 to the full wave rectified output of the diodes 36 and 37, while the collector connection 58 thereof is connected through the relay heater 43 and conductor 45 to the center tap 35 as well as through conductor 42 and resistor 41 to the base connection 47 of the transistor Q1.

The thermal relay 44, which is illustrated as having thermally responsive bimetal means 60 for controlling contacts 61, may be of any type well known in the art which is bistable at half power. Thus, when the relay heater 43 is in a deenergized condition, the contacts 61 are open and will remain open even though the relay heater 43 is then energized to half power. As the energization of the relay increases from half power to a point approaching full power the bimetal flexes from the increase in heat and contacts 61 are actuated thereby to a closed condition which will be maintained even if the power is then reduced to half power due to the inherent temperature differential required to cause the bimetal to open the contacts. Thereafter, reduction of the energization below half power to a point approaching zero power, will effect opening of the contacts 61. Further details of a relay having such characteristics and suitable for use as the relay 44 in the circuit of this invention may be had by reference to my United States Patent No. 3,222,481 and assigned to the assignee of this invention.

The relay contacts 61, when closed, complete an energizing circuit for the compressor 15 which may be traced from the power line L1 through a conductor 63, through the compressor motor, a conductor 64, contacts 61, and a conductor 65 to the power line L2. As described above, during operation of the control circuit 21 rectifiers 36 and 37 supply full wave unfiltered direct current potential to electrode P1 with respect to the transformer center tap 35. If the electrodes P1 and P2 are connected by a water path, AC current flows between them through the DC blocking capacitor 40 developing voltage A across the biasing resistor 41 and the heater resistance 43.

Referring to FIGS. 5a, 5b, and 5c, in which heater current B is shown in relation to the biasing voltage A, the operation of the circuit will be described. As long as ice 20 insulates the electrodes P1 and P2 from one another to such an extent that the biasing voltage peaks are below the base-emitter threshold voltage C of transistor Q1 as shown in FIG. 5a, transistor Q2 will be nonconducting and the heater current B will be substantially zero. The relay contacts 61 will then be open and the compressor motor 15 idle.

As the ice 20 melts and its diameter about evaporator coil tubing 13a decreases, the surfaces of electrodes P1 and P2 become increasingly exposed to the water in the tank and, the electrode current and the biasing voltage A will gradually increase due to lowering resistance to current flow between the electrodes. When, as shown in FIG. 5b, the electrode current reaches a value such that the peaks of voltage waves A are equivalent to the base-emitter threshold voltage C of transistor Q1, the latter becomes conductive and biases transistor Q2 into conduction, thereby applying voltage on the relay heater 43 and increasing the drive on Q1 through resistor 41. There is, therefore, a convulsive switching action of Q1 and Q2. Since the peak biasing voltage occurs at each quarter cycle, triggering first occurs at this peak or not at all. Consequently, the average power of energization of heater 43 by current B jumps from zero to approximately half power when the peaks of voltage A first reach the threshold voltage C as shown in FIG. 5b. Because the relay 44 is bistable at half power the contacts 61 remain open and the voltage A continues to increase, as shown in FIG. 5c, so that triggering occurs progressively earlier in each cycle and the heater current approaches full power. When the heater current B increases sufficiently beyond half power to actuate the relay, the contacts 61 close and the motor compressor is energized to increase the thickness of the ice 20 about evaporator coil tubing 13a.

As the ice 20 increases in thickness, resistance to current flow between the electrodes P1 and P2 increases and the biasing voltage A decreases until just the peaks thereof reach the threshold voltage C effecting a corresponding decrease in heater current B from full power to half power. Further increase in the ice thickness insulates the electrodes P1, P2 to the extent that the peaks of voltage A fall below the threshold level at which time the heater current is abruptly reduced to zero power and the relay actuated to open the contacts 61 and terminate the freezing cycle of the apparatus. The foregoing sequence of events is repeated as necessary to maintain thickness of the ice 20 about the evaporator coil in an optimum range.

Figure 6:
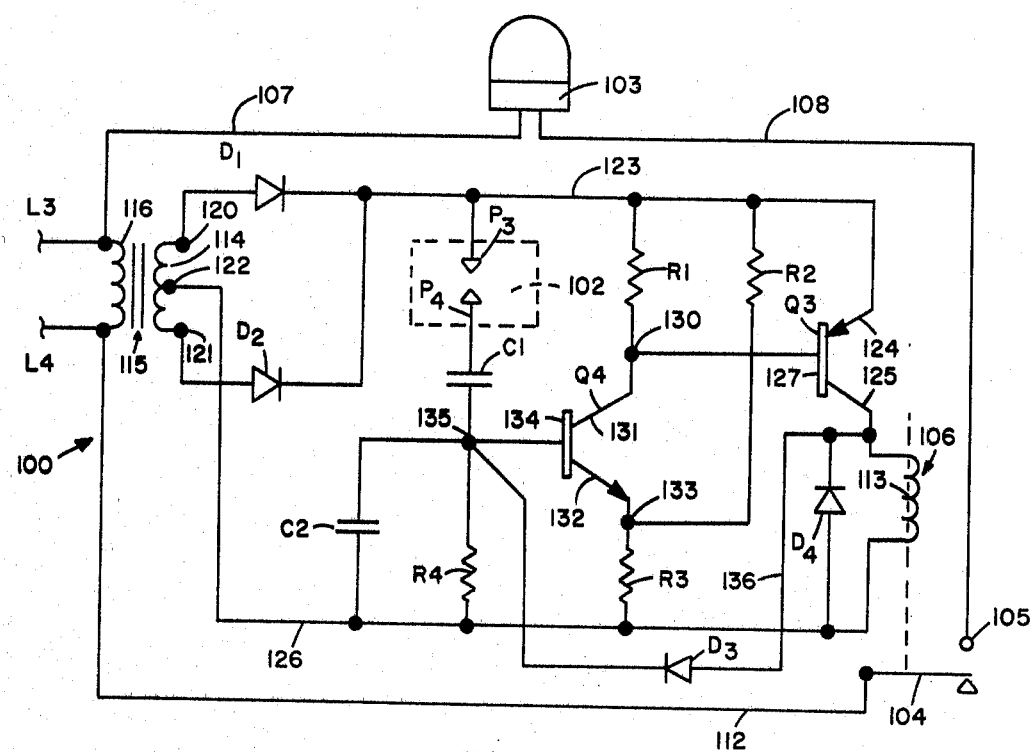
FIG. 6 is a diagrammatic illustration of a modified electronic control circuit embodying the invention.

FIG. 6 illustrates a modified control circuit 100 embodying the present invention and controlling the operation of the evaporator or freezing unit 102 in an ice bank type refrigeration apparatus, including an electric motor driven compressor 103.

The circuit 100 is operative to control operation of the compressor 103 in response to an increase in electrical conductivity between a pair of electrodes P3, P4 occurring by the presence of more or less free water therebetween and to terminate operation of the compressor when the resistance increases due to ice formation between the electrodes. As shown in FIG. 6, the compressor 103 is energized in response to closing of contacts 104, 105 of a solenoid operated relay switch 106 which completes a circuit from power line L3, conductor 107, compressor motor 103, conductor 108, contacts 104, 105, conductor 112 and to power line L4. The contact 104 is moved from its normally open position to close on contact 105 when a solenoid coil 113 of the relay 106 is energized by current passing through a PNP transistor Q3 in response to a given current flow between the electrodes P3, P4.

An unfiltered DC current is supplied to the transistor Q3 from the secondary 114 of a voltage reducing transformer 115 which includes a primary winding 116 connected to the power lines L3, L4 carrying single phase alternating current and such as the usual 115 volt 60 cycle domestic current. The secondary winding 114 of the transformer is provided with end terminals 120, 121 and a center tap 122. The end terminals 120, 121 are connected through rectifier diodes D1, D2 to a conductor 123 to provide an unfiltered full wave rectified current in the conductor. When the transistor Q3 is turned on current flows from the conductor 123 through the emitter 124 and collector 125 of the transistor, through the relay coil 113 and back to the center tap 122 by way of conductor 126.

The base 127 of the transistor Q3 is connected to the junction 130 of the collector 131 of an NPN transistor Q4 and a resistor R1 connected with the conductor 123. The emitter 132 of the transistor Q4 is connected with the junction 133 of resistors R2 and R3 connected between conductors 123 and 126. The potential at the collector 131 of the transistor Q4 affects the bias at the base of the transistor Q3 to control conduction of current flow through the emitter and collector thereof.

The base 134 of the transistor Q4 is connected to a junction 135 between a capacitor C1 and a resistor R4, which is connected by conductor 126 to the center tap 122. A second capacitor C2 is connected between junction 135 and conductor 126 and in parallel with R4.

The construction of the electrodes P3, P4 and their mode of connection with the evaporator 102 is the same as that described in reference to the electrodes P3, P4 and electrode P3 is connected to conductor 123 and electrode P4 is connected to the capacitor C1 so that the full wave unfiltered DC potential applied to electrode P3 will result in an AC current flow between the electrodes for biasing the transistor Q4 on when the electrodes are connected by a given path of free water. When Q4 is biased on current flows from the conductor 123, through the resistor R1, collector 131 and emitter 132 of the transistor Q4, resistor R3 to the conductor 126 back to the center tap. As the transistor Q4 starts to turn on, the base 127 of the transistor Q3 is biased to start that transistor conducting which results in current flow from the conductor 123 through the transistor, the coil 113 and conductor 126 to the center tap. Additionally, when the transistor Q3 starts to conduct, a potential is impressed on the base 134 of transistor Q4 by a circuit comprising the collector 125, conductor 136 and a diode D3. The diode D3 is oriented to permit current to flow from the collector of the transistor Q3 to the base of the transistor Q4 while preventing current flow in the opposite direction. The additional potential thus impressed on the base connection 134 of the transistor Q4 causes the transistor Q4 to be turned full on. When the transistor Q4 is turned on, voltage at the junction 130 biases the transistor Q3 full on, thus energizing the solenoid relay coil 113 to close the contacts 104, 105. A diode D4 is connected in parallel with the relay coil 113 to provide a short circuiting discharge path for current induced when the coil is de-energized to prevent damage to the other components of the circuit.

The capacitor C2 provides a storage effect to augment the feedback from the transistor Q3 to the base junction 135 of the transistor by retaining the direct current forward bias. The storage effect of the capacitor C2 provides a substantial hysteresis in the circuit and prevents chattering of the solenoid 113 at marginal threshold voltages impressed on the base 127 of the transistor Q3 as a result of conduction between the electrodes P3, P4. Additionally, the resistors R2, R4 and capacitor C2 are operative to prevent triggering of the transistors Q4 and Q3 in response to antenna pick-up of noise by the solenoid coil 113.

Assuming that the transformer 115 provides 24 volts at the center tap 122, the values of the various circuit components are as follows:

| | |
|---|---|
| Relay coil 113 | 150Ω |
| Resistor R1 | 330Ω |
| Resistor R2 | 6.8KΩ |
| Resistor R3 | 680Ω |
| Resistor R4 | 22KΩ |
| Diode D6 | 2N456 |

| | |
|---|---|
| Capacitor C1 | mfd .068 |
| Capacitor C2 | mfd .022 |

The foregoing circuit provides a control circuit which responds to differences in resistance to current flow between two electrodes to trigger a solenoid coil actuated device without chattering or undesirable frequent operations and the current flow between the electrodes will not produce gases and other undesirable features of electrolytic action.

Figure 7:
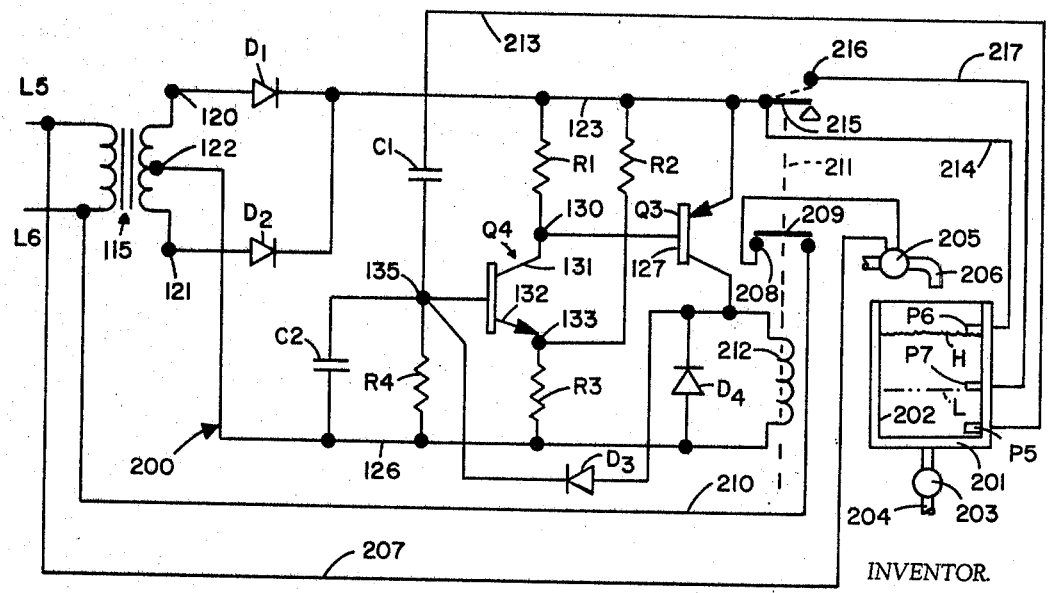
FIG. 7 is a diagrammatic illustration of another modified control circuit embodying the present invention.

FIG. 7 illustrates another modification of a control circuit embodying the present invention in which a control circuit 200 is utilized to control liquid levels in a reservoir or process container 201 in an apparatus such as a vending machine.

The vending machine tank 201 containing a semi-conductive liquid 202 such as water, milk, or carbonated beverage and a conveniently operated valve 203 is operable to discharge liquid from the tank through an outlet conduit 204. Liquid in the tank is replenished from a source, not shown, through a solenoid operated valve 205 and a conduit 206 which directs the liquid into the tank 201. The valve 205 is of a well known type and its details are not shown; suffice to say, it includes a solenoid, not shown, which when energized opens a normally closed valve, and the solenoid is energized from power lines L5, L6, which may be of a conventional 115 v. supply, by a circuit including power line L5, a conductor 207, the solenoid of the valve 205, contacts 208, 209 and a conductor 210 to the other power line L6. The contact 209 is actuated by an armature 211 to move from its normally closed position on contact 208 by the energization of a solenoid 212.

The solenoid 212 is controlled by electrodes P5, P6 and P7 which are spaced vertically in the tank 201 and form part of a control circuit energization of the solenoid 212. The electrodes P5, P6 and P7 are preferably formed from stainless steel and are attached to the tank by suitable fastening means which electrically insulate the electrodes from all parts of the tank. Such means are well known and are not illustrated.

The circuit 200 is like circuit 100, described in reference to FIG. 6, with the exception of the relationship between the electrodes P5, P6 and P7 and their connections in the circuit.

The electrodes P5, P6 and P7 are positioned at different levels in the tank 201 so that the electrode P5 will normally always be covered by liquid in the tank while the electrodes P6 and P7 are located at the maximum and minimum liquid levels desired. When the liquid level in the tank is at the highest level indicated at the line H, the liquid forms a path of relatively low resistance between the electrodes P5 and P6, the control circuit 200 controlled thereby will cause the valve 205 to be denergized and therefore closed. When the liquid level falls to a point below contact with the electrode P7, indicated by the line L, the air gap in the path between the electrodes P5 and P7 is relatively high and the control circuit 200 will be effective to energize the valve 205 and cause it to open and refill the tank with liquid, as described hereinafter.

The control circuit 200 is like control circuit 100 in most respects and like elements are designated by the same character references except that solenoid 212 has been substituted for solenoid 113. The principal difference resides in the substitution of the electrodes P6 and P7 for the electrode P3. The electrode P5 corresponds to electrode P4 in the circuit 100 and is connected to the capacitor C1 by conductor 213. The high level electrode P6 is connected at all times with conductor 123 through conductor 214. Electrode or probe P7, the low level probe, is alternatively connected and disconnected with the conductor 123 through normally open switch contacts 215, 216 and a conductor 217. Contact 215 is movable from contact 216 by the armature 211 when it is attracted by the solenoid 212 and is closed on contact 216 when the solenoid is deenergized. Contact 209 is also moved from contact 208 by the armature 211 when the latter is attracted to a raised position, as viewed in the drawing, by energization of the solenoid 212.

Assuming that the level of liquid in the tank 201 is below the probe P7, the resistance of the path between the probe P5 and either of the probes P6, P7 is relatively high and the transistors Q4, Q3 will not be turned on and 212 will not be energized. Accordingly, switch contacts 208, 209 are closed and the valve 205 being energized is opened, admitting liquid into the tank 201. Switch contacts 215, 216, are open and therefore probe P7 is disconnected from the circuit. When the liquid reaches the level H, a relatively low resistance path is established through the liquid between the probes P5, P6 which turns on the transistor Q4 which turns on the transistor Q3 in the manner described with reference to a relatively low resistance path established in circuit 100 between electrodes P3, P4, and the solenoid 212 is energized to open the contacts 208, 209 and close contacts 215, 216 and close contacts 215, 216, thus closing the valve 205 and connecting probe P7 in the circuit. Because probe P7 is now connected with the conductor 123 in the circuit 200 by contacts 215, 216, the relatively low resistance path will be maintained by the liquid until the liquid level falls below the probe P7. When this occurs, the solenoid circuit is turned off by the reduction in bias on the base of transistor Q4, and the contacts 208, 209 will be reclosed and contacts 215, 216 opened, whereupon the valve 205 will again open to fill the tank as described hereinbefore.

It will be noted that the current flow between the probe P5 and the probes P6 or P7 is the AC component of the unfiltered DC source and that the DC component is blocked by the capacitor C1 so that undesirable unidirectional current flow is obviated.

It now can be seen that an improved control circuit has been provided which is operative in response to changes in the conductivity of the environment surrounding the electrodes in the circuit to perform a control or signal function. While the circuits disclosed in FIGS. 2 and 6 have been described in reference to ice bank refrigerating apparatus, it should be apparent that such a control circuit may be used to detect the presence of a liquid between electrodes in a circuit and cause the circuit to perform a signaling function. For example, such circuits may be used to detect the presence of liquid at a predetermined level in a container, such as an ice making apparatus, and cause the circuit to perform a signal function to initiate harvesting of the ice in response to the change in conductivity between the electrodes.

While three embodiments of the present invention have been described in considerable detail herein, the present invention is not to be considered limited to the precise construction disclosed. It is my intention to cover hereby all adaptations, modifications and uses of the control circuit shown which come within the practice with those skilled in the art to which the invention relates and within the scope of the appended claims.

1. A control circuit for ice bank refrigerators having freezing means, said control circuit comprising:
(a) a pair of electrodes spaced from one another and disposed so as to both be in contact with free water when ice in the bank is less than a predetermined thickness, and to be separated by ice when greater than said predetermined thickness,
(b) a first of said electrodes being connected to one side of a source of unfiltered full wave rectified electrical current, the second of said electrodes being connected to the other side of said source of current through capacitive means, whereby a relatively small pulsating signal current flows between said electrodes are separated by ice and a relatively large signal current flows between said electrodes when said electrodes are separated by free water, (c) a bistable electrode responsive relay operatively associated with said freezing means and having contacts actuatable between a first condition wherein said freezing means is inoperative and a second condition wherein said freezing means is rendered operative for controlling said freezing means, and (d) switching amplifier means connected in series with said relay between said one side of said current source and said other side thereof, said switching amplifier having a predetermined signal threshold being responsive to changes in said signal voltage to effect actuation of said relay to said second condition whereby operation of said freezing means is initiated to increase the thickness of ice when said signal voltage exceeds a first predetermined value, and operation of freezing means is terminated when said signal voltage falls below a second predetermined value appreciably below said first predetermined value.

2. A control circuit for operating freezing means in an ice bank so as to maintain ice thickness therein within a predetermined range, said circuit comprising:

(a) a pair of spaced electrodes disposed in said tank so as to be interconnected by an electric current flow path which increases and decreases in resistance as water in said path freezes and melts, (b) power supply means for applying the pulsating component of an unfiltered full wave rectified electric potential across said electrodes, so that current in said flow path will be in a pulsating current which varies with said resistance, (c) resistance means connected in series with said electrodes to provide a biasing voltage waveform, the amplitude of which increases and decreases with decreases and increases in said flow path resistance, (d) switching amplifier means responsive to said biasing voltage and having a predetermined threshold of response so as to be triggered into a conductive phase when said biasing voltage amplitude exceeds said threshold, and (e) a relay coupled to said amplifier means for energization during said conductive phase of said amplifier means, said relay having contacts actuable to energize said freezing means.

3. A control circuit for operating electrically powered freezing means in an ice bank tank so as to maintain ice thickness therein within a predetermined range, said circuit comprising:

(a) a pair of spaced electrodes disposed in said tank so as to be interconnected by an electric current flow path which increases and decreases in resistance as water in said path freezes and melts, (b) power supply means for applying the pulsating component of an unfiltered full wave rectified AC electric potential across said electrodes, (c) resistance means connected in series with said electrodes to provide a biasing voltage waveform, the amplitude of which increases and decreases with decreases and increases in said flow path resistance, (d) switching amplifier means having a predetermined threshold of response and triggered into a conductive phase by said biasing voltage amplitude exceeding said threshold, (e) a bistable electro-responsive relay connected by said amplifier means to a source of electric current for energization during said conductive phase and having contacts actuatable in response to energization thereof for energizing said freezing means, said relay being inoperable at half power to energize said freezing means and actuable by energization at more than half power to energize said freezing means, and (f) said amplifier means being rendered non-conductive upon each reduction of said pulsating component of said full wave potential to zero so that energization of said relay is at half power when the peak amplitude of said biasing voltage just reaches said threshold, increases toward full power as said biasing voltage amplitude increases above said threshold, and drops abruptly to zero when the biasing voltage falls below said threshold, whereby an appreciable differential is established between the flow path resistance which will actuate said relay to energize said freezing means and the flow path resistance which will terminate energization of said freezing means.

4. A control circuit for operating electrically powered freezing means in an ice bank tank so as to maintain ice thickness therein within a predetermined range, said circuit comprising:

(a) a pair of spaced electrodes disposed in water in said tank so as to be connected by an electric current flow path which increases and decreases in resistance as water in said path freezes and melts.

(b) power supply means for applying the pulsating component of an unfiltered full wave rectified AC electric potential so said electrodes, so that electrode current in said flow path will vary with said resistance, (c) resistance means connected in series with said electrodes to provide a biasing voltage having waveform peaks corresponding in amplitude to said electrode current, (d) a relay having contact means for controlling operation of said freezing means, and electrically energizable actuator means for said contact means, said relay being inactive in response to half power energization of said actuator means and actuable to closed and open conditions upon energization of said actuator means above and below half power respectively, and (e) a switching amplifier connected between a source of electric current and said relay actuator means, said amplifier being responsive to said biasing voltage and having a predetermined threshold of response so as to be triggered into conductive phase when the amplitude of said biasing voltage peaks exceeds said threshold and returned to non-conductive condition when said biasing voltage falls to zero, so that energization of said actuator means jumps from zero to half power when said wave peaks just reach threshold, increases toward full power as said amplitude exceeds said threshold, and drops to zero power when said amplitude falls below said threshold.

5. A control circuit for an ice making machine having a power driven water freezing unit submerged in water, said control circuit comprising:

(a) an electrically energized relay for controlling operation of said freezing unit, (b) a pair of spaced electrodes, (c) means to apply voltage to said electrodes comprising a center tapped transformer providing two secondary circuits each including a diode, one of said electrodes being connected with said secondary circuits so as to have half of each wave impressed thereon;

(d) means connecting the other electrode in said secondary circuits comprising a blocking condenser in series therewith, (e) a transistor having a base connected in series with said condenser, the collector of said transistor being connected in both of said secondary circuits through a resistor in series with said diodes therein, and the emitter of said transistor being connected to the center tap of the secondary of said transformer through a resistor, (f) a second transistor having its emitter connected in both said secondary circuits in series with said diodes therein and having its collector connected with said base of the first mentioned transistor through a resistor, the base of said second transistor being connected with the collector of said first mentioned transistor, and (g) means connecting said electrically energized relay in said secondary circuits in series with the collector and emitter of said second transistor.

6. A control circuit for ice bank refrigerators having electrically operated freezing units as set forth in claim 5 further characterized by said relay comprising a solenoid coil connected between the collector of said second transistor and the center tap of said transformer, and a condenser and resistor connected in parallel between the base of the first mentioned transistor and said center tap.

7. A control circuit for ice bank refrigerators having electrically operated freezing units as set forth in claim 5 further characterized by said relay comprising a solenoid coil connected between the collector of said second transistor and the base of the first mentioned transistor, and further including a diode connected between the collector of said second transistor and the base of said first transistor and oriented to block the flow of current from the last mentioned base to the last mentioned collector.

8. A control circuit for an electrically energizable device comprising, a pair of spaced electrodes, means to apply a pulsating voltage to said electrodes comprising a center tapped transformer providing two secondary circuits each including a diode, one of said electrodes being connected with said secondary circuits so as to have half of each pulsation impressed thereon, means connecting the other electrode in said secondary circuits comprising a blocking condenser in series therewith, a transistor having a base connected with said condenser, the collector of said transistor being connected in both of said secondary circuits through a resistor in series with said diodes therein, and the emitter of said transistor being connected to the center tap of the secondary of said transformer through a resistor, a second transistor having its emitter connected in both said secondary circuits in series with said diodes therein and having its collector connected with said base of the first mentioned transistor through a resistor, the base of said second transistor being connected with the collector of said first mentioned transistor, means connecting said electrically energized device in said secondary circuits in series with the collector and emitter of said second transistor, and a resistor and condenser connected in parallel between said base of said first mentioned transistor and said center tap of said transformer.

9. A control circuit adapted to be associated with terminals of a source of unfiltered rectified current and operable in response to conduction through an electrolytic fluid between spaced locations to actuate a servomechanism, said circuit comprising a pair of electrodes positioned at said locations a first of said electrodes being connected with the source and said pair of electrodes adapted to be connected by an electric current flow path through the electrolytic fluid therebetween, switching amplifier means including first and second transistors regeneratively coupled together and responsive to voltage at said second electrode and having a predetermined threshold of response so as to be triggered from a non-conductive condition to a conductive condition when said voltage amplitude exceeds said threshold, a relay connectable to the source through said amplifier means and energized when said amplifier is in said conductive condition to control operation of the servomechanism and circuit means connected between said second electrode and said switching amplifier means for providing only a pulsating component of the unfiltered rectified electric potential across said electrodes so that current in the flow path through the electrolytic fluid is a pulsating current whereby the affects of electrolysis on said electrodes and said fluid are minimized.

10. A control circuit as defined in claim 9 wherein said means for providing said pulsating current includes a capacitor connected in series between said second electrode and said switching amplifier means.

11. A control circuit as defined in claim 10 wherein said capacitor is connected to a base electrode of said first transistor.

12. A control circuit adapted to be associated with terminals of a source of unfiltered rectified current and perable in response to conduction through an electrolytic fluid between spaced locations to actuate a servomechanism, said circuit comprising a pair of electrodes positioned at said locations, a first of said electrodes being connected with the source and said pair of electrodes adapted to be connected by an electric current flow path through the electrolytic fluid therebetween, switching amplifier means including first and second transistors regeneratively coupled together and responsive to voltage at said second electrode and having a predetermined threshold of response so as to be triggered from a non-conductive condition to a conductive condition when said voltage amplitude exceeds said threshold, a relay connectable to the source through said amplifier means and energized when said amplifier is in said conductive condition to control operation of the servomechanism, circuit means connected between said second electrode and said switching amplifier means for providing only a pulsating component of the unfiltered rectified electric potential across said electrodes so that current in the flow path through the electrolytic fluid is a pulsating current whereby the effects of electrolysis on said electrodes and said fluid are minimized, a third electrode spaced intermediate said first and second electrodes, said electrodes adapted to be spaced vertically apart in the electrolytic fluid with the servomechanism operative to change the level of said fluid, and relay contacts actuated by said relay between a first condition wherein said third electrode is connected to the source and adapted to carry current therefrom through the fluid to one of said first and second electrodes and a second condition wherein said third electrode is disconnected from the source and ineffective to carry current to either of said first and second electrodes.

13. A control circuit adapted to be associated with terminals of a source of unfiltered rectified current and operable in response to conduction through an electrolytic fluid between spaced locations to actuate a servomechanism, said circuit comprising a pair of electrodes positioned at said locations a first of said electrodes being connected with the source and said pair of electrodes adapted to be connected by an electric current flow path through the electrolytic fluid therebetween, switching amplifier means including first and second transistors regeneratively coupled together and responsive to voltage at said second electrode and having a predetermined threshold of response so as to be triggered from a non-conductive condition to a conductive condition when said voltage amplitude exceeds said threshold, a relay connectable to the source through said amplifier means and energized when said amplifier is in said conductive condition to control operation of the servomechanism, and circuit means connected between said second electrode and said switching amplifier means for providing only a pulsating component of the unfiltered rectified electric potential across said electrodes so that current in the flow path through the electrolytic fluid is a pulsating current whereby the effects of electrolysis on said electrodes and said fluid are minimized, said first and second electrodes adapted to be positioned in a refrigeration unit with the electrolytic fluid therebetween frozen at least in part by said unit and wherein said switching amplifier means is triggered in response to a predetermined change in conductivity of said current flow path as said fluid freezes.

14. A control system for detecting the condition of a freezing media and controlling an apparatus adapted to control conditions of the freezing media, a pulsating direct current source of electrical energy and impedance means varying the magnitude of its impedance in accordance with predetermined freezing and nonfreezing conditions of the media, the system comprising output controlling means, controller means connected in circuit with said output controlling means and operatively connected with the apparatus for controlling the operation of the apparatus in response to an electrical condition of said controlling means, and condition responsive control circuit means coupled in controlling relation with said controlling means in response to the predetermined freezing and nonfreezing conditions of the media including condition sensing circuit means connected to the impedance means for producing a condition signal in response to variations of the impedance means, signal producing circuit means for producing a control signal in response to said condition signal, said signal producing means varying the conductive conditions of said controlling means in response to said condition signal, and reactive impedance means in circuit between said condition sensing circuit means and said signal producing circuit means for blocking direct current components of the pulsating source of electrical energy from said condition sensing circuit means.

15. A control system for detecting the condition of a freezing media and controlling an apparatus adapted to control conditions of the freezing media, and impedance means varying the magnitude of its impedance in accordance with predetermined freezing and nonfreezing conditions of the media, the system comprising a pulsating direct current source of electrical energy, output controlling means, controller means connected in circuit with said output controlling means and operatively connected with the apparatus for controlling the operation of the apparatus in response to an electrical condition of said controlling means, and condition responsive control circuit means coupled in controlling relation with said controlling means in response to the predetermined freezing and nonfreezing conditions of the media including condition sensing circuit means connected to the impedance means for producing a condition signal in response to variations of the impedance means, signal producing circuit means for producing a control signal in response to said condition signal, said signal producing means varying the conductive conditions of said controlling means in response to said condition signal and capacitive reactive impedance means in circuit between said condition sensing circuit means and said signal producing circuit means for blocking direct current components of the source of electrical energy from said condition sensing circuit means.

16. A control system for detecting the condition of a freezing media and controlling an apparatus adapted to control conditions of the freezing media comprising a unidirectional semiconductor, controlling means having first, second and third electrode means, relay switching means connected in circuit with said first and second electrodes of said controlling means, said relay switching means being operatively connected with the apparatus for controlling the apparatus in response to a change in electrical condition of said controlling means, and condition responsive control circuit means coupled in controlling relation with said controlling means in response to predetermined freezing and nonfreezing conditions of the media including condition sensing circuit means having impedance means, said impedance means varying the magnitude of its impedance in accordance with the freezing and nonfreezing conditions of the media and a signal producing circuit means having semiconductor means connected to said third electrode for producing a control signal which varies in magnitude in accordance with the variation in magnitude of the impedance means, said semiconductor means having an electrode connected at one end of said impedance means and the other end of said impedance means being connected to a source of electrical energy, said signal producing means varying the conductive condition of said controlling means in response to said control signal.

17. A control system for detecting the condition of a freezing media and controlling an apparatus adapted to control conditions of the freezing media comprising a unidirectional output controlling means having first and second electrode means, controller means connected in circuit with said controlling means and operatively connected with the apparatus for controlling the apparatus in response to an electrical condition of said controlling means, and condition responsive control circuit means coupled in controlling relation with said controlling means in response to predetermined freezing and nonfreezing conditions of the media including condition sensing circuit means having a plurality of probes positioned in the environment of the media and varying the magnitude of the impedance between the probes in accordance with the freezing and nonfreezing conditions of the media and a signal producing circuit means for producing a control signal which varies in magnitude in accordance with the variation in magnitude of the impedance, said signal producing means varying the conductive condition of said controlling means in response to said control signal.

18. A control system for detecting the condition of a freezing media and controlling an apparatus adapted to control conditions of the freezing media comprising a unidirectional output controlling means having first and second electrode means, controller means connected in circuit with said controlling means and operatively connected with the apparatus for controlling the apparatus in response to an electrical condition of said controlling means, and condition responsive control circuit means coupled in controlling relation with said controlling means in response to predetermined freezing and nonfreezing conditions of the media including condition sensing circuit means having a plurality of probes positioned in the environment of the media and varying the magnitude of the impedance between the probes in accordance with the freezing and nonfreezing conditions of the media and a signal producing circuit means having semiconductor means connected to said third electrode for producing a control signal which varies in magnitude in accordance with the variation in magnitude of the impedance, said semiconductor means having an electrode connected to one of said probes, another of said probes being connected to a source of electrical energy whereby a condition of said electrical energy as impressed on said semiconductor means is varied in accordance with the impedance between said electrodes, said signal producing means varying the conductive condition of said controlling means in response to said control signal.

19. A control system for detecting the condition of a freezing media and controlling an apparatus adapted to control conditions of a freezing media comprising a unidirectional semiconductor controlling means having first, second and third electrodes, current responsive relay means connected in circuit with said controlling means and operatively connected with the apparatus for controlling the apparatus in response to variation of current through said controlling means, and condition responsive control circuit means coupled in controlling relation with said controlling means in response to predetermined freezing and nonfreezing conditions of the media including condition sensing circuit means having a plurality of probes positioned in the environment of the media and varying the magnitude of the impedance between the freezing and nonfreezing probes in accordance with the conditions of the media and a signal producing circuit means including control semiconductor means having a first electrode connected to said third electrode of said controlling means for producing a control signal which varies in magnitude in accordance with the variation in magnitude of the impedance, said semiconductor means having a second and third electrode, one of said second and third electrodes being connected to one of said probes, another of said probes being connected to a source of electrical energy whereby current from said electrical energy fed to a circuit comprising two of said first, second and third electrodes of said control semiconductor means is varied in accordance with the impedance between said electrodes, said signal producing means varying the conductive condition of said controlling means in response to said control signal.

20. A control system for detecting the condition of a freezing media and controlling an apparatus adapted to control the amount of freezing of a media between predetermined approximate maximum and minimum limits comprising a unidirectional output controlling means having first and second electrode means, controller means connected in circuit with said controlling means and operatively connected with the apparatus for controlling the apparatus in response to an electrical condition of said controlling means, and condition responsive control circuit means coupled in controlling relation with said controlling means in response to a predetermined degree of freezing of the media including condition sensing circuit means having a plurality of probes so positioned in the media that at least the predetermined maximum of frozen media falls between said probes, the magnitude of the impedance between said probes varying in accordance with the amount of freezing of the media and a signal producing circuit means for producing a control signal which varies in magnitude in accordance with the variation in magnitude of the impedance between said probes, said signal producing means varying the conductive condition of said controlling means in response to said control signal.

21. A control system for detecting the condition of a freezing media and controlling an apparatus adapted to control the amount of freezing of a media between predetermined approximate maximum and minimum limits comprising output controlling means having first, second and third electrode means, controller means connected in circuit with said first and second electrodes of said controlling means and operatively connected with the apparatus for controlling the apparatus in response to an electrical condition of said controlling means, and condition responsive control circuit means coupled in controlling relation with said controlling means in response to a predetermined degree of freezing the media including condition sensing circuit means having a plurality of probes so positioned in the media that at least the predetermined maximum of frozen media falls between said probes, the magnitude of the impedance between said probes varying in accordance with the amount of freezing of the media and a signal producing circuit means connected to said third electrode for producing a control signal which varies in magnitude in accordance with the variation in magnitude of the impedance between said probes, said signal producing means varying the conductive condition of said controlling means in response to said control signal.

22. A control system for detecting the condition of a freezing media and controlling an apparatus adapted to control the amount of freezing of a media between predetermined approximate maximum and minimum limits comprising a unidirectional semiconductor controlling means having first, second and third electrode means, relay switching means connected in circuit with said first and second electrodes of said controlling means, said relay switching means being operatively connected with the apparatus for controlling the apparatus in response to a change in electrical condition of said controlling means, and condition responsive control circuit means coupled in controlling relation with said controlling means in response to a predetermined degree of freezing the media including condition sensing circuit means having a plurality of probes so positioned in the media that at least the predetermined maximum of frozen media falls between said probes, the magnitude of the impedance between said probes varying in accordance with the amount of freezing of the media and a signal producing circuit means having semiconductor means connected to said third electrode for producing a control signal which varies in magnitude in accordance with the variation in magnitude of the impedance between said probes, said semiconductor means having an electrode connected at one end of said impedance means and the other end of said impedance means being connected to a source of electrical energy, said signal producing means varying the conductive condition of said controlling means in respose to said control signal.

23. A control system for detecting the condition of a freezing media and controlling an apparatus adapted to control conditions of a freezing media and a source of input electrical energy comprising a unidirectional output controlling means having first and second electrode means, controller means connected in circuit with said controlling means and operatively connected with the apparatus for controlling the apparatus in response to an electrical condition of said controlling means, condition responsive control circuit means coupled in controlling relation with said controlling means in response to predetermined freezing and nonfreezing conditions of the media including condition sensing circuit means having first impedance means, said first impedance means varying the freezing and nonfreezing magnitude of its impedance in accordance with the conditions of the media and a signal producing circuit means having semiconductor means connected to said electrode means for producing a control signal which varies in magnitude in accordance with the variation in magnitude of said first impedance means, said semiconductor means having an electrode connected at one end of said impedance means and the other end of said impedance means being connected to a source of electrical energy, said signal producing means varying the conductive condition of said controlling means in response to said control signal.

References Cited

UNITED STATES PATENTS

| | | | |
|---|---|---|---|
| Re. 24,268 | 1/1957 | Zuckerman | 200—122 |
| 2,558,063 | 6/1951 | Seyffert | 62—139 X |
| 2,824,283 | 2/1958 | Ellison | 324—30 X |
| 2,897,436 | 7/1959 | Doutz | 324—30 |
| 2,954,679 | 10/1960 | Blackett | 62—344 X |
| 2,967,982 | 2/1961 | Dubbelman | 317—148.5 |
| 3,081,419 | 3/1963 | Simon | 317—148.5 |
| 3,084,265 | 4/1963 | Cleland. | |
| 3,188,617 | 6/1965 | Jones et al. | 317—148.5 X |

WILLIAM E. WAYNER, Primary Examiner

U.S. Cl. X.R.

37—392; 73—304; 324—30; 340—234